(12) United States Patent
Szczukowski et al.

(10) Patent No.: US 6,280,132 B1
(45) Date of Patent: Aug. 28, 2001

(54) FASTENING ARRANGEMENT OF AN ASSEMBLY PART ONTO A CARRIER PART

(75) Inventors: Adi Szczukowski, Menden; Klaus Spickenheier, Iserlohn; Peter Kirchhoff, Wickede, all of (DE)

(73) Assignee: ITW Automotive Products GmbH & Co., Iserlohn (DE)

( * ) Notice: Subject to any disclaimer, the term of this patent is extended or adjusted under 35 U.S.C. 154(b) by 0 days.

(21) Appl. No.: 09/258,134

(22) Filed: Feb. 26, 1999

(30) Foreign Application Priority Data

Mar. 7, 1998 (DE) .......................... 298 04 041 U

(51) Int. Cl.⁷ ..................... F16B 39/00; F16B 21/18
(52) U.S. Cl. .................. 411/353; 411/107; 411/999
(58) Field of Search .................... 411/352, 353, 411/107, 970, 999

(56) References Cited

U.S. PATENT DOCUMENTS

| | | | |
|---|---|---|---|
| 1,409,606 | * | 3/1922 | Stendahl . |
| 3,811,733 | * | 5/1974 | DeRegnaucourt .................. 411/353 |
| 4,732,519 | * | 3/1988 | Wagner ................. 411/353 |
| 5,094,579 | * | 3/1992 | Johnson ................ 411/353 |
| 5,244,325 | * | 9/1993 | Knohl ................... 411/107 |
| 5,255,647 | * | 10/1993 | Kiczek ................... 411/353 |
| 5,662,444 | * | 9/1997 | Schmidt ............................. 411/999 |
| 5,871,319 | * | 2/1999 | Schneider ............................. 411/353 |

* cited by examiner

Primary Examiner—Flemming Saether
(74) Attorney, Agent, or Firm—Lowe Hauptman Gilman & Berner, LLP

(57) ABSTRACT

An arrangement for fastening of an assembly part on a carrier part includes at least one fastening screw, a sleeve, and a flexible assembly ring whose inner diameter is smaller than an outer diameter of a sleeve head flange and foot flange and which is arranged between the head flange and foot flange on the sleeve. The assembly part includes a through-bore in the assembly part whose inner diameter is at lest as large as the outer diameter of the foot flange, into which the sleeve is inserted. The lower side of the head flange is indirectly or directly supported on the upper edge region of the through-bore. The inner diameter of the through-bore is dimensioned such that the assembly ring is radially pressed together therein and by way of this clamped in and/or the through-bore comprises an undercut with an inner diameter so that the assembly ring under radial compression and subsequent expansion is pushed through the undercut and by which the assembly ring is retained in the through-bore.

A threaded bore in the carrier part, into which is screwed the thread of the fastening screw and on whose edge region the foot flange of the sleeve is supported.

20 Claims, 6 Drawing Sheets a)

b)

a)

b)

a)

b)

FASTENING ARRANGEMENT OF AN ASSEMBLY PART ONTO A CARRIER PART

TECHNICAL FIELD

The invention relates to a fastening of an assembly part onto a carrier part.

One possible application of the invention is in automobile technology. e.g., fastening of a cylinder head cover to a cylinder head. Another appreciation is fastening of an intake chamber to a motor.

BACKGROUND ART

Relevant fastenings in which a fastening screw is arranged telescopically in a sleeve, wherein a knurling of the screw shank at a distance from the screw head in cooperation with a necking at the upper end of the sleeve to ensure retention of the fastening screw and sleeve, are already known.

In one embodiment, a head flange of the sleeve is supported on a rubber ring which is pressed into a receiver of a cylinder head cover. A foot flange of the sleeve is buttoned into a through-bore with an undercut of a further rubber part which is arranged between the cylinder head cover and the cylinder head. By way of this a decoupling is effected, i.e. the hard screw head as well as the sleeve are not pressed directly against the cover which may consist of plastic. On the other hand the sleeve of metal prevents excess pressing of the rubber parts. With this arrangement, a secure temporary assembly of the screw, sleeve and rubber parts to the cylinder head cover is possible which permits transport in any position up to assembly on the cylinder head. It is, however of a disadvantage that the screw, when mounting the cylinder head cover, with its lower end may slide over the sealing surfaces of the cylinder head and cause damage. With long screws the knurling may even press against the necking of the sleeve and loosen the temporary assembly. With another fastening, a rubber ring is arranged between the head flange of the sleeve and the assembly part. The rubber ring below has a collar with three hooks distributed on the circumference which engage behind the undercuts in a through-bore of the assembly part. The collar however must have a certain thickness so that on pressing into the through-bore they are not pressed axially together. Because the hooks form the only securement this fastening is not adequately safe in transport. Furthermore the telescoping ability is limited by the abutment of the knurling on the necking so that there prevails a relatively long screwing out of the sleeve and thus the guiding as well as the assembly of the cylinder head cover (assembly part) is made more difficult.

With another fastening the rubber ring is pressed into the assembly part at its large circumference. This sleeve may be arranged in the rubber ring with play so that it may be telescoped up to the abutment of its foot flange on a collar of the rubber ring. Since the screw may also be displaced with respect to the sleeve there results as a whole an enlarged ability to telescope which favours the application on a carrier component. However the circumferential pressing does not ensure any particularly secure preassembly in the assembly part.

With yet another fastening, the foot flange engages behind several undercuts, which in a cover part are preferably injected from plastic. The manufacture requires complicated injection tools. Furthermore the undercuts on pressing in the foot flange may shear off so that the transport securement is not ensured.

It is an object of the invention to provide a fastening of an assembly part to a carrier part, which improves the security of a temporary pre-assembly, favours an assembly without the protrusion of the screw ends out of the assembly part and may be applied in the case of decoupling as well as in the hard screw case.

SUMMARY OF THE INVENTION

A fastening arrangement according to the invention of an assembly part on a carrier part has at least one fastening screw which comprises a screw head with engaging surfaces for a tool, a screw shank, at least one radial projection on the screw shank at a distance from the screw head and a thread at least at the distance of the radial projection from the screw head. The radial projection may be formed from the upper end of the thread. Preferably however at least one special projection is present. With this it may be the case of a single projection which extends only about a part or about the whole circumference, or several radial projections which are distributed over the circumference of the screw shank, in particular in the form of a knurling.

Furthermore the fastening has a sleeve with an inner diameter which corresponds at least to the outer diameter of the radial projection and of the thread, which preferably at the upper end comprises a narrow location with an inner diameter smaller than the outer diameter of the radial projection, however at least as large as the outer diameter of the screw shank between the screw head and the radial projection. The narrow location may be formed by at least one radially inwardly protruding projection of the sleeve. Furthermore the sleeve comprises at the upper end a head flange and at the lower end a foot flange preferably with a smaller diameter than the head flange. Into the sleeve the fastening screw is applied wherein the narrow location is snapped over the radial projection of the fastening screw and is allocated to the screw head of the outer side of the head flange. The applied fastening screw may thus be axially displaced in the sleeve, is however unlosably retained therein by abutment of the radial projection on the narrow location.

Further there is present a flexible assembly ring whose inner diameter is smaller than the outer diameter of the foot flange and which is arranged between the head flange and foot flange on the sleeve. Preferably the assembly ring is elastic so that by broadening, sliding over the flange, preferably the foot flange, and subsequent elastic retraction on the sleeve, it can be assembled on the sleeve. Between the assembly ring and the foot flange there may be present a radial play, by which means a compensation of tolerances and heat expansions is favoured.

A through-bore in the assembly part has an inner diameter, which is at least as large as the outer diameter of the foot flange so that the sleeve with the inserted fastening screw may be inserted into the through-bore. With this the assembly ring is pre-assembled on the sleeve. The inner diameter of the through-bore is dimensioned such that it radially presses together the assembly ring on insertion and by way of this is clamped in and/or the through-bore comprises an undercut with an inner diameter so that the assembly ring under radial compression and subsequent expansion is pushed through the undercut and by which the assembly ring is retained in the through bore. The throughbore may have the undercut at the upper end, which may clamp in the assembly ring in an intermediate position and/or after broadening retain it in a bordering bore section. In the bordering bore section the assembly ring may still be clamped in. The through bore may however have the same inner diameter everywhere so that it clamps in the assembly ring in every possible insertion location. The sleeve is supported with the lower side of the head flange directly over an elastic intermediate position on the upper edge region of the through-bore.

In the carrier part there is present at least one threaded bore into which the thread of the fastening screw is screwed in and on whose edge region there is supported the foot flange of the sleeve. The supporting of the assembly part may either be effected directly or via an elastic intermediate layer.

The fastening according to the invention, by way of the radial projection of the fastening screw and the narrow location of the sleeve, the arrangement of the assembly ring between the head flange and the foot flange and the clamping tight and/or the retaining of the assembly ring in the assembly part, favours unlosable pre-assembly. A protrusion of the fastening screw out of the assembly part is avoided since the fastening screw with respect to the sleeve as well as the sleeve with respect to the assembly ring may be telescoped. The fastening is suitable for the hard screw case as well as for an elastically decoupled screwing. Manufacturing and heat tolerances may be compensated for by play between the sleeve and assembly ring. The elements can be easily embodied so that they resist high loadings in particular on account of temperature and aggressive substances, such as for example as occur with motors.

Finally the invention envisages the fastening of an assembly part to a carrier part with at least one fastening screw, which comprises a screw head with engagement surfaces for a tool and collar, a screw shank, a further collar on the screw shank at a distance from the screw head and a thread at least at the distance of the further collar from the screw head. Furthermore the fastening has a flexible assembly ring whose inner diameter is smaller than the outer diameter of the collars and which is arranged between the collars on the screw shank. Further to this there is present a through bore in the assembly part whose inner diameter is at least as large as the outer diameter of the further collar, into which the fastening screw is inserted, wherein the lower side of the collar is indirectly or directly supported on the upper edge region of the through-bore, wherein however the inner diameter of the through-bore is dimensioned such that the assembly ring is radially pressed together therein and by way of this is clamped in and/or the through bore comprises an undercut with an inner diameter so that the assembly ring under radial compression and subsequent expansion is pushed through the undercut and by which the assembly ring is retained in the through-bore. Finally the fastening has a threaded bore in the carrier part into which is screwed the thread of the fastening screw and on whose edge region the further collar is supported. With this fastening the collar and the further collar of the fastening screw assume essentially the function of the head flange and foot flange of the sleeve, which is done away with. Particularities of the head flange and the foot flange from the dependent claims may in as far as is possible, be transmitted to the collar and the further collar of the fastening screw.

BRIEF DESCRIPTION OF THE DRAWING

The invention is hereinafter described in more detail by way of the accompanying drawings of several embodiment examples. In the drawings there are shown.

BEST MODE FOR CARRYING OUT THE INVENTION

In the FIGS. 2 to 5 for reasons of simplification the carrier part is omitted. In all drawings figures, components corresponding to one another are indicated with the same reference numbers.

Figure 1:
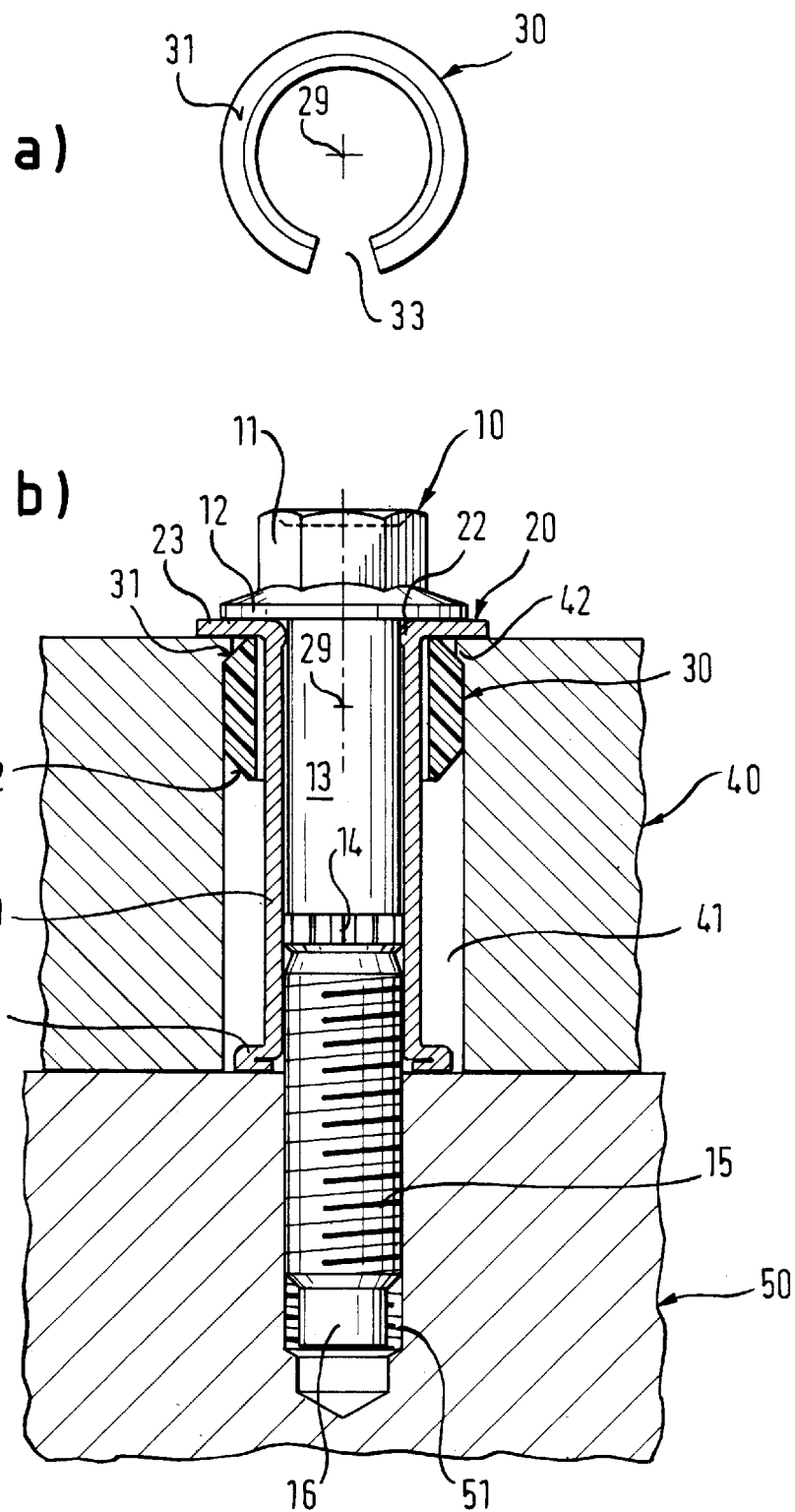
FIG. 1 is an assembly ring in plan view (a) and in longitudinal section (b)

The fastening arrangement according to FIG. 1 includes a fastening screw 10, a sleeve 20, an assembly ring 30, an assembly part 40 and a carrier part 50.

The fastening screw 10 has a head 11 formed at a lower side thereof with a radially projecting collar 12 and a screw shank 13 which comprises a knurling 14 located a distance from the screw head and which extends over the whole circumference. Up to the knurling 14 the screw shank 13 is formed smoothly cylindrical. The outer diameter of the knurling 14 which is taken on a circle laid by the outer ends of the knurling is larger than the smooth cylindrical region of the screw shank 13. On the side of the knurling 14 distant to the screw head 11 the screw shank 13 carries a thread 15 whose outer diameter is somewhat smaller than the outer diameter of the knurling 14. At the lower end the fastening screw 10 has a cylindrical introduction peg 16, whose outer diameter again is smaller than that of the thread 15.

The screw 10 is preferably manufactured from a metallic material wherein the knurling 14 and the thread 15 may be rolled.

The sleeve 20 has a smooth cylindrical section 21, whose inner diameter somewhat exceeds the outer diameter of the knurling 14 so that displacement of the fastening screw 10 in the sleeve 20 is possible. At the upper end of the smooth cylindrical section 21, the sleeve 20 on the inside has a narrow location in the form of a circumferential necking 22. In the longitudinal section the necking 22 is recognizable as a slightly bulged contour on the inner side of the sleeve 20. Its inner diameter, i.e. the diameter at the location of its smallest cross section, is smaller than the outer diameter of the knurling 14, but somewhat larger than the outer diameter of the smooth-cylindrical region of the screw shank 13. Preferably it is also somewhat larger than the outer diameter of the thread 15 so that this is not damaged on passage. In the region of the necking 22 and the knurling 14 there is practically no play present between the sleeve 20 and the fastening screw 10 so that the screw 10 can be tilted with respect to the sleeve 20 only negligibly.

At the upper end the sleeve has a radially outwardly projecting head flange 23 and at the lower end it comprises a radially outwardly projecting foot flange 24. The outer diameter of the head flange 23 is larger than the outer diameter of the foot flange 24.

The sleeve 20 is preferably likewise manufactured of a metallic material, wherein the necking 22 as well as the head flange 24 may be manufactured by a shaping procedure. The latter at the same time may be manufactured by two beading procedures in opposite directions, by which means there results a doubling of the wall thickness. The sleeve 20 may however also be manufactured by swarf-producing machining, e. g. by turning.

The assembly ring 30 is formed smooth-cylindrically with bevelings 31, 32 at the upper and lower end. On its side it comprises a longitudinal slot 33 whose width slightly reduces towards its centre. The longitudinal slot with respect to its plane of cross section through its centre 34 is formed symmetrically. Its inner diameter somewhat exceeds the outer diameter of the middle section 21 of the sleeve 20, but is somewhat smaller than the outer diameter of the foot flange 24.

The assembly ring 30 is elastic. For application with motors it may be designed resistant to oil and heating. It may be manufactured of an elastic material for example of a thermoplastic plastic, of an elastomer or thermoplastic elastomer. It may also consist of metal.

The assembly part 40 has a through-bore 41, whose inner diameter is somewhat larger than the outer diameter of the foot flange 24, but smaller than the outer diameter of the assembly ring 30 in the untensioned condition. Above, the through-bore 41 has an undercut 42 with an even smaller inner diameter. This is however so large that the foot flange 24 may be guided through, on the other hand, the head flange 23 does not fit through, but considerably overlaps the upper edge region of the through-bore 41. The inner diameter of the undercut 42 and the outer diameter of the assembly ring 30 are dimensioned such that the assembly ring on passing through is maximally pressed together so far radially that it bears on the outer side of the sleeve 20 or the two ends of the assembly ring 30 abut against one another.

The assembly part 40 may consist of metal or of plastic.

The assembly part 40 and the carrier part 50 abut against one another with planar sides.

The carrier part 50 has a threaded bore 51 receiving the thread of the fastening screw 10. The foot flange 24 may be supported on the upper edge region of the threaded bore 51. The length of the sleeve 20 and the through-bore 41 are matched to one another such that with a resting foot flange 24 the head flange 23 rests on the upper edge region of the through-bore 41 and the assembly part 40 is pressed between the head flange 23 and the carrier part 50 in a controlled manner.

This fastening is pre-mounted in that the fastening screw 10 is first pressed into the upper end of the sleeve 20 until the necking 22 snaps behind the knurling 14. The assembly ring 30 is widened until is fits over the foot flange 24 and is then pushed over the section 21 and springs back together elastically. Due to its symetry, ring 30 need not be oriented in a certain manner for mounting. This unit may then be pre-mounted with the assembly part 40 in that the sleeve 20 is inserted into the through-bore 41 and the assembly ring 30 seated thereon is pressed in. If the assembly ring 30 has passed the undercut 42 it is untensioned somewhat. The undercut 42 and the remaining clamping then prevent the assembly ring 30 from exiting upwards out of the through-bore. On the other hand, the head flange 23 prevents the sleeve 20 from falling downwards out of the through bore 41. The pre-assembly is thus securely protected from an unintentional falling apart even when the assembly part 40 with the screw head 11 is transported downwards.

For the assembly of the assembly part 40 on the carrier part 50, the fastening screw 10 may slide up to the abutment of the knurling 14 on the necking 22 and the sleeve 20 up to the abutment of the foot flange 24 on the assembly ring. For applying the assembly part 40 onto the carrier part 50 the lower end 16 of the fastening screw 10 may recede in the through-bore 41. This is particularly advantageous when the threaded bores 51 by displacement of the assembly part 40 must be "searched" on the carrier part 50 until the fastening screws with the introduction pegs 16 fall into the threaded bores 51, in particular when the assembly part 40 at several locations must be fixed in this manner.

Finally the fastening screw 10 is screwed into the carrier part 50 until its collar 12 exerts a sufficient clamping force onto the head flange 23 in order to tension the sleeve 20 with the carrier part 50 and the assembly part 40, between the head flange 23 and carrier part 50. The play between the sleeve 20 and the assembly ring 30 ensures the compensation of manufacturing tolerances and heat expansions.

Figure 2:
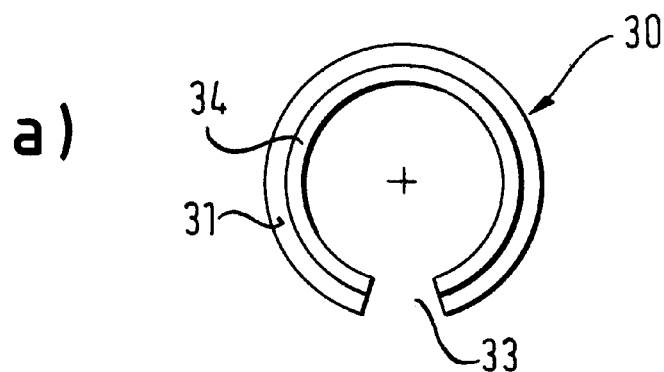
FIG. 2 is an assembly ring with end sections for supporting a sleeve in an intermediate position in plan view (a) and in longitudinal section (b)
Figure 2:
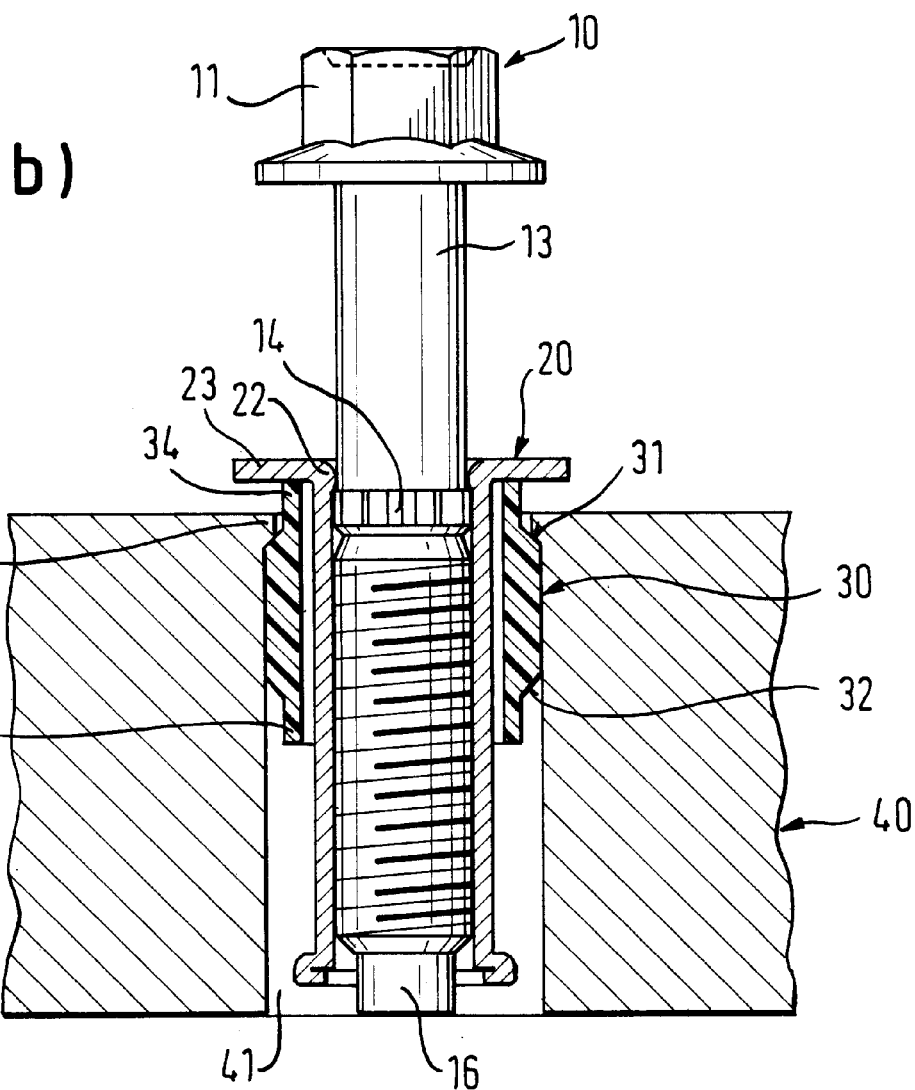
Figure 3:
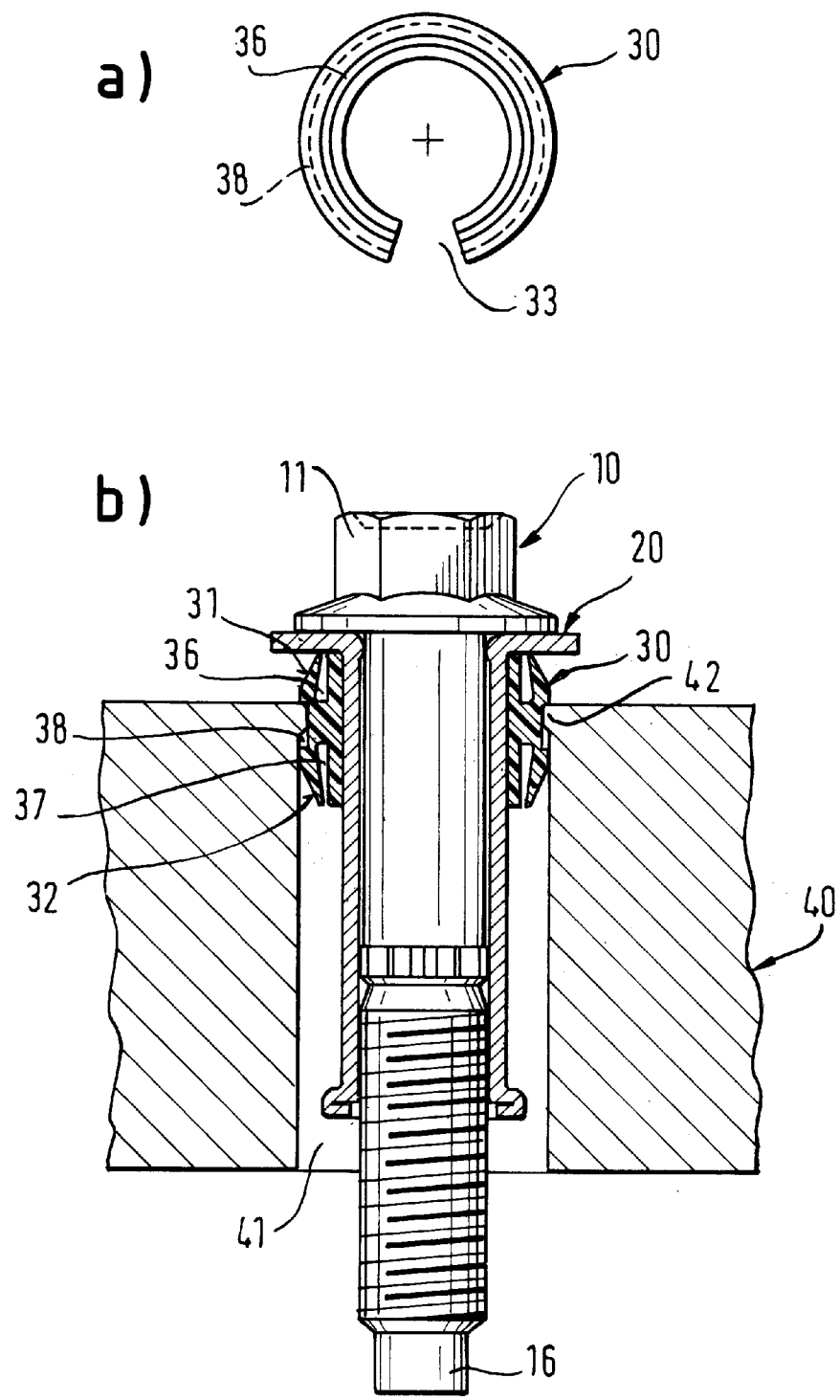
FIG. 3 is an assembly ring with end regions of increased flexibility in plan view (a) and in an intermediate position in longitudinal section (b)

A disadvantage of the previously mentioned play is that the sleeve 20 with its telescoping may tilt in the assembly ring 30 and, as a result the position of the screw head 11 is not exactly determined. In an automatic screw station it is therefore no longer ensured that the tool finds the screw head. FIG. 2 relates to a solution of this problem.

With this solution the assembly ring 30 above and below in each case has a smooth-cylindrical end section 34, 35 with a reduced diameter, wherein however the inner diameter of the assembly ring 30 is constant everywhere. In the shown intermediate position the assembly ring 30 is exactly snapped with its beveling 31 behind the undercut 42 of the through-bore 41 of the assembly part 40. The assembly ring is still pressed together somewhat so that it is retained in this position by a remaining clamping. With this the upper end section 34 above protrudes somewhat beyond the assembly part 40. The head flange 23 of the sleeve 20 is supported on the upper end section 34. As a result of this the fastening screw 10, until its knurling 14 reaches the necking, may be slid somewhat higher than if the head flange 23 is seated on the upper side of the assembly part 40. As a result of this the introduction peg 16 of the fastening screw 10 may be completely pushed into the through-bore without the head flange 23 being lifted from its support on the upper end section 34 of the assembly sleeve 30. For this reason the sleeve 20 does not tilt and the screw head 11 is retained in a position which may be securely controlled also by an automatic screwing tool. On screwing, the assembly ring 30 is completely pressed into the assembly part.

The above fastening however only functions when it is directed more or less vertically before the screwing. Otherwise the sleeve 20 may tilt in the assembly ring 30. For differing applications, in particular the horizontal screwing case, there is the embodiment according to FIG. 3.

With this embodiment the assembly ring 30 above and below in each case has an axial circumferential slot 36, 37. Furthermore the assembly ring 30 on the outside at half the height has a circumferential annular groove 38. On the outside the assembly ring is dimensioned such that with a bending together of the "hook barb" defined by the slots 36, 37 and the groove 38 in the two end regions, it can be fixed in the through-bore 41. With this the annular groove 38 may just accommodate the undercut 42 in order to secure the assembly ring 30 in an intermediate position. The inner diameter of the assembly ring 30 is selected such that the sleeve 20 may be guided therein in a manner free of play and with a horizontal alignment that does not tilt. As a result of this also in a horizontal screwing case the locating of the screw head 11 with a screwing tool is simplified.

If the screwing tool has located the screw head 11, the assembly ring 30 is completely pressed into the through-bore 41 on screwing in the fastening screw 10.

Figure 4:
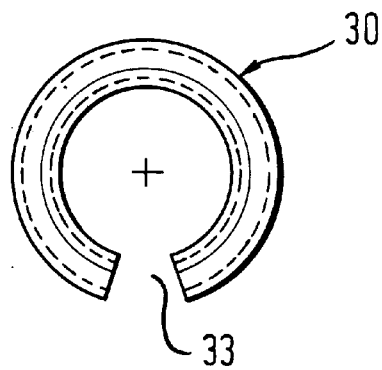
FIG. 4 is an assembly ring with inner projecting contact regions on the two ends in plan view (a) and in an intermediate position in longitudinal section (b)
Figure 4:
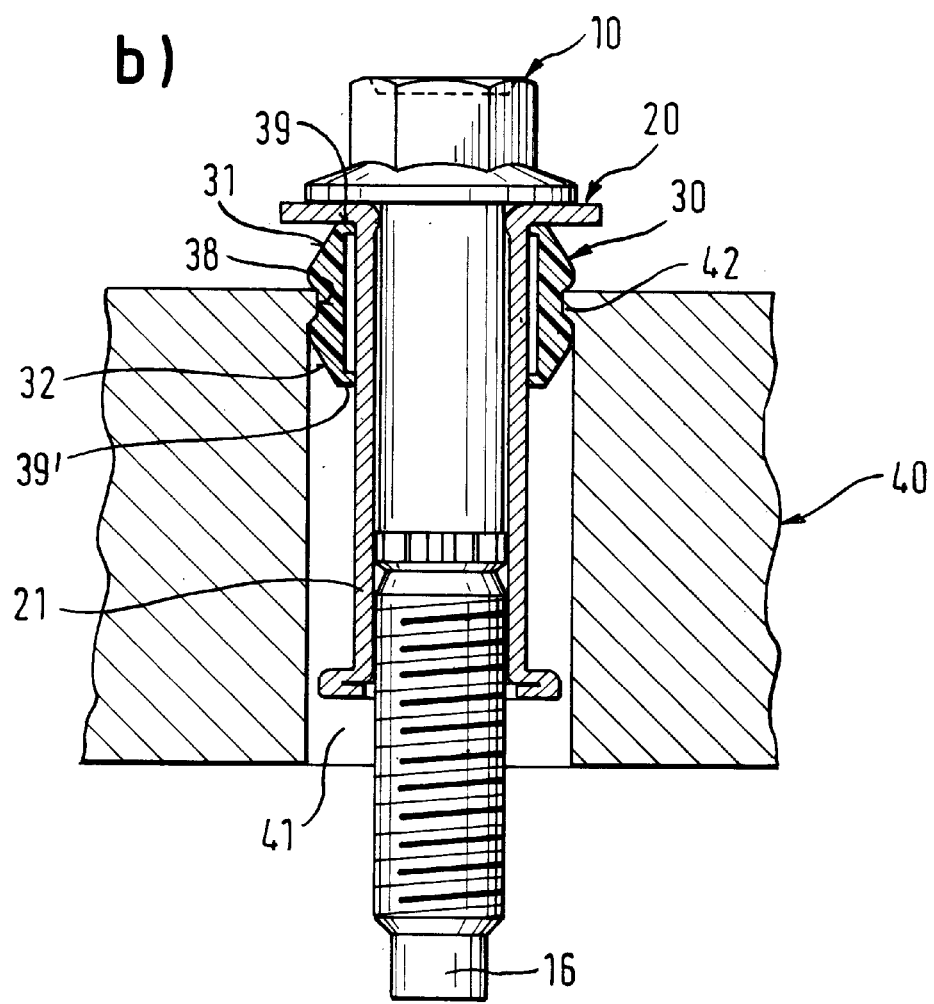

With the above embodiment example the pressing in of the assembly ring 30 may be made more difficult by the reduced flexibility in the middle region, where a full cross section is present. FIG. 4 shows an embodiment which is suitable for a horizontal screwing case in which the pressing in of the assembly ring 30 is favoured by way of an increased flexibility. For this the assembly ring 30 at the upper and lower end in each case has inwardly projecting contact regions 39, 39'. The inner diameter of the contact regions corresponds roughly to the outer diameter of the section 21 of the sleeve 20 so that a displacement of the two parts relative to one another is possible without tilting. The inner diameter of the assembly part between the contact surfaces 39, 39' is larger than the outer diameter of the section 21.

The lower slant 32 favours the leading through of the lower contact region 39' through the undercut 42 of the assembly part 40. With an advancing pressing in, the assembly ring 30 deflects radially inwards between the contact regions 39, 39' until its annular groove 38 accommodates the undercut 42. Then the sleeve 20 is in turn supported so high that the fastening screw 10 with its introduction peg 16 with or without lifting the sleeve 20 can be engaged into the through-bore 41. A pivoting of the sleeve 20 with respect to the assembly ring 30 is prevented by the contact regions 39, 39' and by way of this the screwing is favoured. On screwing in, the assembly ring 30 again is completely pressed into the through-bore 41, until the slant 31 is arranged behind the undercut 42.

Figure 5:
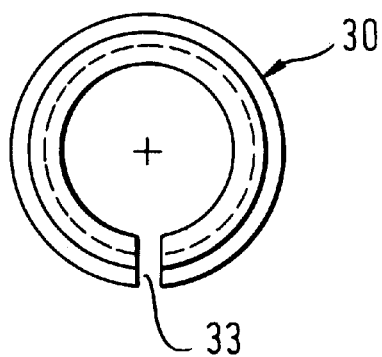
FIG. 5 is a metallic assembly ring in the plan view (a) and in longitudinal section (b)
Figure 5:
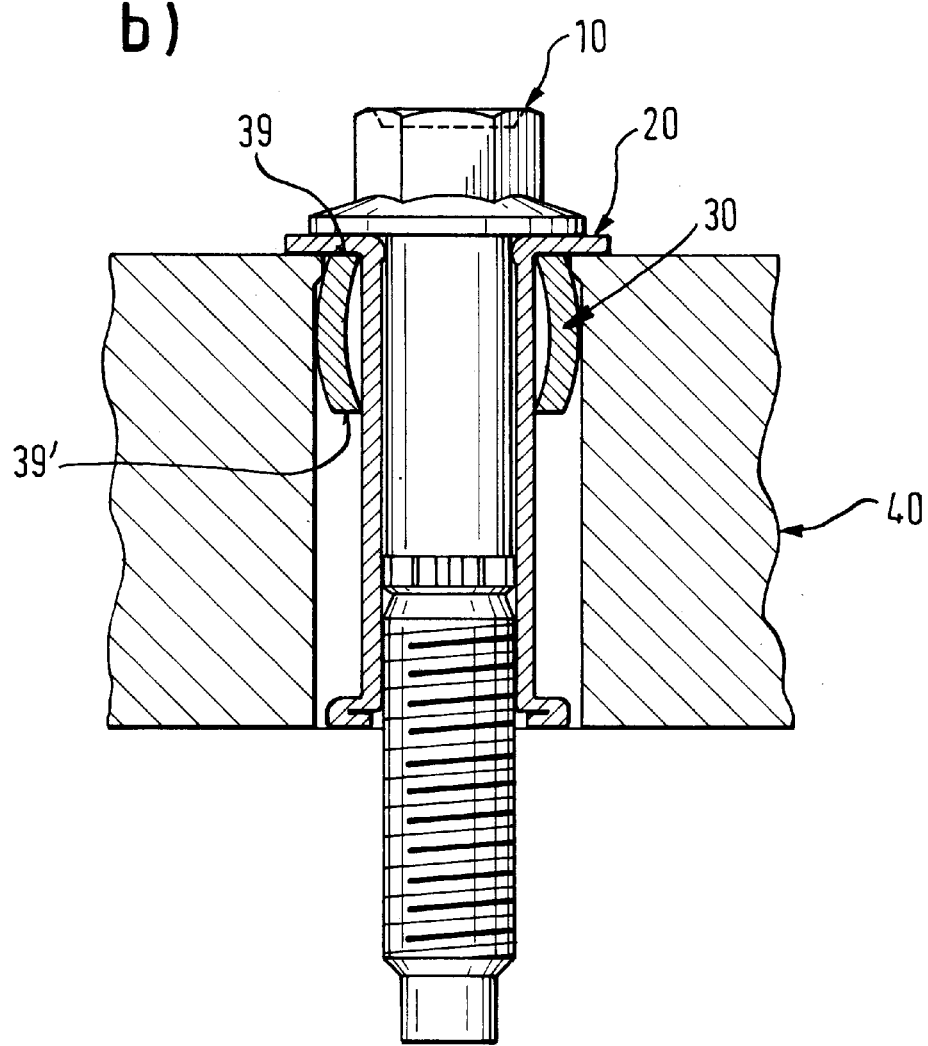

The FIG. 5 shows an embodiment form with an assembly ring 30 preferably of spring steel. The assembly ring 30 is formed barrel-shaped and likewise comprises a slot 33. It is manufactured in that a tape material is drawn through a matrix and subsequently rolled to a ring. This assembly ring 30 acts similarly to that in FIG. 4, since its concave inner contour at the upper and lower end forms supports 39, 39'. Such an assembly ring 30 may also consist of plastic.

Figure 6:
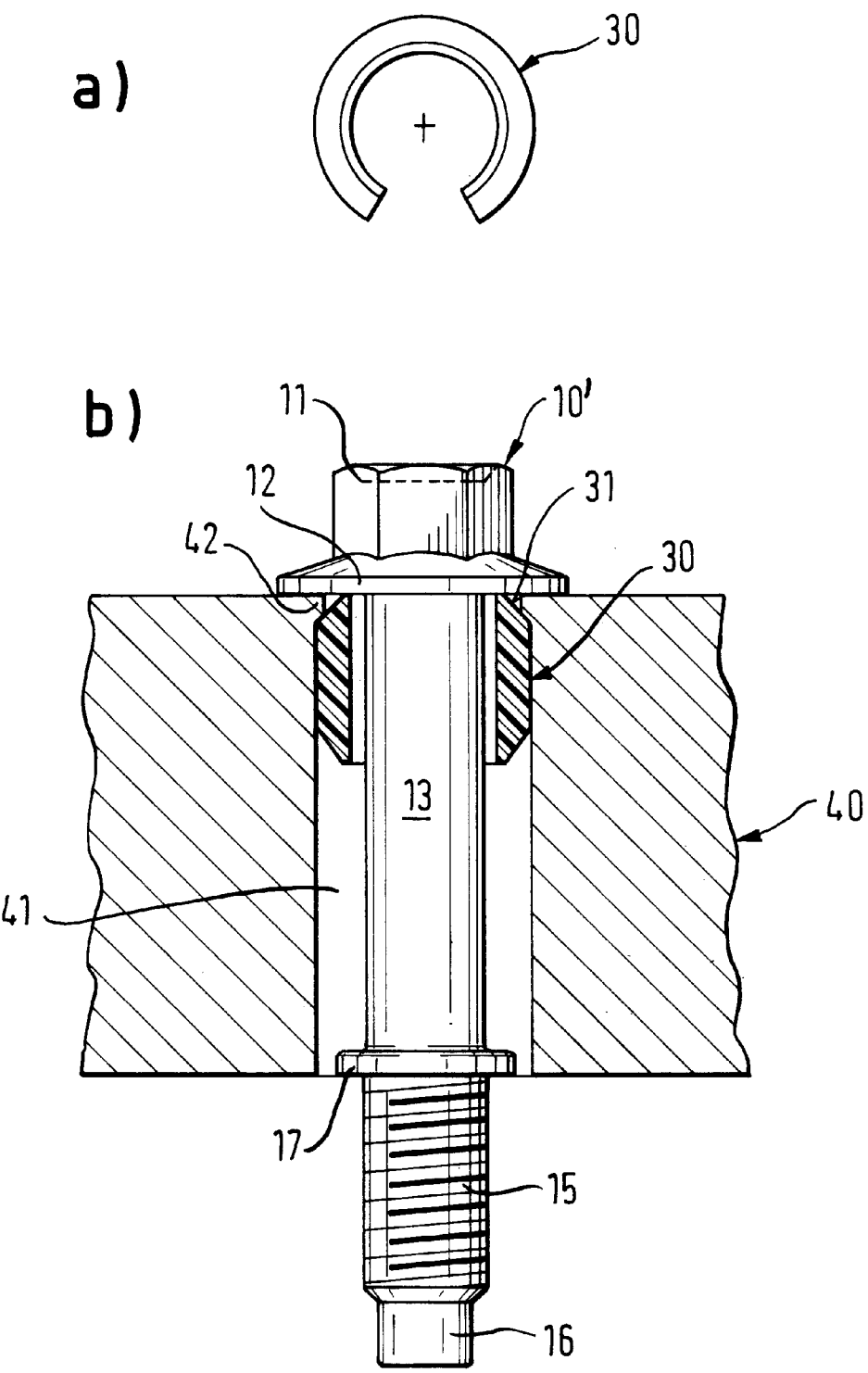
FIG. 6 is an assembly ring in the plan view (a) and a fastening with the assembly ring and a collar screw in longitudinal section (b).

Finally FIG. 6 shows an embodiment with a "collar screw" 10', which apart from the collar 12 at the lower side of the head 11 at the end of a smooth-cylindrical screw shank 13 comprises a further collar 17 from which in turn the thread 15 extends. The fastening screw 10' is fixed with the help of an elastic assembly ring 30 into a through-guide 41 of an assembly part 40. With this the inner diameter of the through-bore 41 is somewhat larger than the outer diameter of the further collar 17, but smaller than the outer diameter of the assembly ring 30 in the untensioned condition. Furthermore the through-bore 41 above has an undercut 42 with an even smaller inner diameter, which is however so large that the further collar 17 may be guided through, but on the other hand the collar 12 cannot pass through, but considerably overlaps the upper edge region of the through-bore 41. On the passage through the undercut 42 the assembly ring 30 is maximumly pressed radially so far together that it bears on the outer side of the screw shank 13 or its two ends abut against one another. If the assembly ring 30 has passed the undercut 42 it untensions somewhat and is rigidly seated in the through-bore 41 below the undercut 42 in a secured position. The further collar 17 is supported on the non-shown carrier part and the assembly part 40 is clamped rigidly between the collar 12 and the carrier part.

What is claimed is:

1. A fastening arrangement for securing an assembly part (40) on a carrier part (50), comprising:
    at least one fastening screw (10) including a screw head (11) with engaging surfaces for interacting with a tool, a screw shank (13), at least one radial projection (14) on the screw shank (13) at a spaced distance from the screw head (11) and a thread (15) located between the radial projection (14) and an end of the shank remote from the screw head (11),
    a sleeve (20) formed as a single unitary piece having an inner diameter along its entire length which corresponds at least to an outer diameter of the radial projection (14) and of the thread, said sleeve including a radially inward projection (22) formed with an inner diameter smaller than the diameter of the radial projection (14) but at least as large as the outer diameter of the screw shank (13) between the screw head (11) and the radial projection (14), an upper end of the sleeve comprises a head flange (23) and a lower end of the sleeve includes a foot flange (24) extending only outwardly, said fastening screw (10) is inserted into the sleeve such that the radially inward projection (22) is snapped over the radial projection (14) of the fastening screw (10) to locate the screw head (11) adjacent an outer side of the head flange (23),
    a flexible assembly ring (30) having an inner diameter smaller than an outer diameter of each of the head flange (23) and the foot flange (24), said assembly ring mounted on said sleeve between the head flange (23) and the foot flange (24) and the height of the sleeve between the head and foot flanges is at least double the height of the assembly ring and wherein an outer diameter of the assembly ring is less than the outer diameter of the head flange and an axial length of the assembly ring is greater than an axial thickness thereof.

2. A fastening according to claim 1, wherein the radial projection (14) is formed separately from the thread (15).

3. A fastening according to claim 2, wherein the radial projection comprises a knurling (14) on the screw shank (13).

4. A fastening according to claim 1, wherein the end of the screw shank (13) remote from the screw head (10) comprises a cylindrical introduction peg (16) with a smaller outer diameter than the thread (15).

5. A fastening according to claim 1, wherein the screw head (11) includes a lower radially projecting collar (12).

6. A fastening according to claim 1, wherein a distance between a lower side of the head flange (23) to a lower side of the foot flange (24) is adapted to be smaller than the length of the through-bore (41) of the assembly part (40) for pressing of the assembly part (40) between the head flange (23) and the carrier part (50).

7. A fastening according to claim 1, wherein a distance between a lower side of the head flange (23) to a lower side of the foot flange (24) is adapted to be smaller than the length of the through-bore (41) and between the head flange (23) and the assembly part (40) there is arranged an elastic intermediate position for pressing of the assembly part (40) between the intermediate position and the carrier part (50).

8. A fastening according to claim 1, wherein the sleeve (20) is arranged in the assembly ring (30) with slight play.

9. A fastening according to claim 8, wherein the fastening screw (10), sleeve (20), assembly ring (30) and through-bore (41) are dimensioned such that with the radial projection (14) and the foot flange (24) adapted to not protrude from the through-bore (41).

10. A fastening according to claim 1, wherein the assembly ring with respect to a center cross sectional plane is symmetrical.

11. A fastening according to claim 1, wherein the assembly ring (30) is elastic.

12. A fastening according to claim 1, wherein the assembly ring (30) is selected from the group consisting of plastic, elastomer and metal.

13. A fastening according to claim 1, wherein the assembly ring (30) has an end section (34,35) which in an intermediate position of the assembly ring (30) adapted to protrude above out of the passage bore (41) and on which the head flange (23) is supported, wherein the fastening screw (10), sleeve (20) assembly ring (30) and through-passage (41) are dimensioned such that the fastening screw (10), with the bearing of the radial projection (14) on the radially inward projection (22) snapped thereover, is adapted to not protrude from the lower end of the through-bore (41).

14. A fastening according to claim 1, wherein the assembly ring (30) comprises axial circumferential slots (36, 37) formed at both end faces which delimit regions of higher flexibility for clamping of the ring in the through bore (41).

15. A fastening according to claim 1, wherein the inner diameter of the assembly ring (30) is roughly equal to the outer diameter of the sleeve (20) between the head flange (23) and the foot flange (24).

16. A fastening according to one claim 1, wherein the assembly ring (30) externally comprises an annular groove (38).

17. A fastening according to claim 16, wherein the assembly ring (30) in an intermediate position can be fixed with the annular groove (38) on the undercut (42), wherein the assembly ring is adapted to partially protrude out of the upper end of the through bore (41) and keeps the head flange (23) at a distance from the assembly part (40).

18. A fastening arrangement for securing an assembly part (40) on a carrier part (50), comprising:
at least one fastening screw (10) including a screw head (11) with engaging surfaces for interacting with a tool, a screw shank (13), at least one radial projection (14) on the screw shank (13) at a spaced distance from the screw head (11) and a thread (15) located between the radial projection (14) and an end of the shank remote from the screw head (11),
a sleeve (20) formed as a single unitary piece having an inner diameter along its entire length which corresponds at least to an outer diameter of the radial projection (14) and of the thread, said sleeve including a radially inward projection (22) formed with an inner diameter smaller than the diameter of the radial projection (14) but at least as large as the outer diameter of the screw shank (13) between the screw head (11) and the radial projection (14), an upper end of the sleeve comprises a head flange (23) and a lower end of the sleeve includes a foot flange (24) extending only outwardly, said fastening screw (10) is inserted into the sleeve such that the radially inward projection (22) is snapped over the radial projection (14) of the fastening screw (10) to locate the screw head (11) adjacent an outer side of the head flange (23),
a flexible assembly ring (30) having an inner diameter smaller than an outer diameter of each of the head flange (23) and the foot flange (24), said assembly ring mounted on said sleeve between the head flange (23) and the foot flange (24) and the height of the sleeve between the head and foot flanges is at least double the height of the assembly ring and wherein an outer diameter of the assembly ring is less than the outer diameter of the head flange and an axial length of the assembly ring is greater than an axial thickness thereof, wherein said assembly part (40) includes a through-bore (41) and wherein the fastening screw (10), sleeve (20), assembly ring (30) and through-bore (41) are dimensioned such that the radial projection (14) and the foot flange (24) are adapted to not protrude from the through-bore (41).

19. A fastening arrangement for securing an assembly part (40) on a carrier part (50), comprising:
at least one fastening screw (10) including a screw head (11) with engaging surfaces for interacting with a tool, a screw shank (13), at least one radial projection (14) on the screw shank (13) at a spaced distance from the screw head (11) and a thread (15) located between the radial projection (14) and an end of the shank remote from the screw head (11),
a sleeve (20) formed as a single unitary piece having an inner diameter along its entire length which corresponds at least to an outer diameter of the radial projection (14) and of the thread, said sleeve including a radially inward projection (22) formed with an inner diameter smaller than the diameter of the radial projection (14) but at least as large as the outer diameter of the screw shank (13) between the screw head (11) and the radial projection (14), an upper end of the sleeve comprises a head flange (23) and a lower end of the sleeve includes a foot flange (24) extending only outwardly, said fastening screw (10) is inserted into the sleeve such that the radially inward projection (22) is snapped over the radial projection (14) of the fastening screw (10) to locate the screw head (11) adjacent an outer side of the head flange (23),
a flexible assembly ring (30) having an inner diameter smaller than an outer diameter of each of the head flange (23) and the foot flange (24), said assembly ring mounted on said sleeve between the head flange (23) and the foot flange (24), wherein the assembly ring (30) at upper and lower ends thereof comprises radially inwardly projecting contact regions (39,39') whose inner diameter corresponds roughly to the outer diameter of the sleeve (20) between the flanges (23,24), wherein the assembly ring is supported on the sleeve (20) between the head flange (23) and the foot flange (24) and between which the assembly ring can be radially compressed.

20. A pre-assembly comprising in combination:
a carrier part;
an assembly part including a through-bore therein;
a fastening arrangement securing the assembly part to the carrier part, said fastening arrangement including:
(i) at least one fastening screw (10) including a screw head (11) with engaging surfaces for interacting with a tool, a screw shank (13), at least one radial projection (14) on the screw shank (13) at a spaced distance form the screw head (11) and a thread (15) located between the radial projection (14) and an end of the shank remote from the screw head (11),
(ii) a sleeve (20) having an inner diameter which corresponds at least to an outer diameter of the radial projection (14) and of the thread, said sleeve including a radially inward projection (22) formed with an inner diameter smaller than the diameter of the radial projection (14) but at least as large as the outer diameter of the screw shank (13) between the screw head (11) and the radial projection (14), an upper end of the sleeve comprises a head flange (23) and at a lower end of the sleeve includes a foot flange (24), said fastening screw (10) being inserted into the sleeve such that the radially inward projection (22) is snapped over the radial projection (14) of the fastening screw (10) to locate the screw head (11) adjacent an outer side of the head flange (23), (iii) a flexible assembly ring (30) having an inner diameter smaller than an outer diameter of each of the head flange (23) and the foot flange (24), said assembly ring being mounted on the sleeve (20) and arranged between the head flange (23) and the foot flange (24), (iv) said assembly part (40) including said through-bore (41) having an inner diameter at least as large as the outer diameter of the foot flange (24) and into which the sleeve (20) is inserted, wherein a lower side of the head flange (23) is supported on an upper edge region of the through-bore (41), wherein the inner diameter of the through-bore (41) is dimensioned such that the assembly ring (30) has portions radially pressed thereon in clamping engagement with the through-bore (41), said through-bore (41) further comprises an undercut (42) with an inner diameter enabling the assembly ring (30) under radial compression and subsequent expansion to be pushed through the undercut (42) and thereby the assembly ring is retained in the through-bore (41), and (v) said carrier part (50) includes a threaded bore (51) receiving the thread (15) of the fastening screw (10) and having an edge region to support the foot flange (24) of the sleeve (20).

\* \* \* \* \*